United States Patent
Chhabra et al.

(10) Patent No.: US 8,989,096 B2
(45) Date of Patent: Mar. 24, 2015

(54) APPLICATION-AWARE RADIO POWER SAVING

(71) Applicant: Apple Inc., Cupertino, CA (US)

(72) Inventors: Kapil Chhabra, Millpitas, CA (US); Tito Thomas, San Jose, CA (US); Amit K. Vyas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 13/711,473

(22) Filed: Dec. 11, 2012

(65) Prior Publication Data

US 2014/0105084 A1    Apr. 17, 2014

Related U.S. Application Data

(60) Provisional application No. 61/714,047, filed on Oct. 15, 2012.

(51) Int. Cl.
*H04W 4/00*     (2009.01)
*H04B 7/212*    (2006.01)
*H04W 52/02*    (2009.01)
*H04W 76/04*    (2009.01)

(52) U.S. Cl.
CPC ........ *H04W 52/0209* (2013.01); *H04W 76/046* (2013.01); *H04W 52/0254* (2013.01); *H04W 52/0258* (2013.01); *H04W 52/0251* (2013.01); *Y02B 60/50* (2013.01)
USPC .......................................... 370/328; 370/348

(58) Field of Classification Search
None
See application file for complete search history.

(56) References Cited

U.S. PATENT DOCUMENTS

| | | | |
|---|---|---|---|
| 7,274,929 B1 | 9/2007 | Banginwar | |
| 2004/0072559 A1 | 4/2004 | Kakumaru et al. | |
| 2006/0050670 A1 | 3/2006 | Hillyard et al. | |
| 2008/0175204 A1* | 7/2008 | Jen | 370/331 |
| 2010/0313050 A1* | 12/2010 | Harrat et al. | 713/323 |
| 2013/0016638 A1* | 1/2013 | Lee et al. | 370/311 |
| 2013/0083713 A1* | 4/2013 | Johansson et al. | 370/311 |
| 2013/0114581 A1* | 5/2013 | Jones | 370/336 |
| 2013/0122918 A1* | 5/2013 | Boley et al. | 455/450 |
| 2014/0105087 A1* | 4/2014 | Gupta et al. | 370/311 |

FOREIGN PATENT DOCUMENTS

EP    1858200    11/2007

* cited by examiner

*Primary Examiner* — Christopher Crutchfield
(74) *Attorney, Agent, or Firm* — Park, Vaughan, Fleming & Dowler LLP; Steven E. Stupp

(57) ABSTRACT

In order to facilitate reduced power consumption of an electronic device (such as a smartphone) when communicating with another electronic device (such as an access point) in a wireless network, the electronic device may change a wake policy based on the applications executing on the electronic device. In particular, the electronic device may monitor a subset of the applications currently executed by a processor in the electronic device, where the subset can include zero or more of the applications. Based on the subset, the wake policy of an interface circuit in the electronic device may be changed. This wake policy may specify a frequency of wake ups to receive information from the other electronic device and/or monitoring of unicast or multicast bits in a Traffic Indication Map element. In this way, the time that the electronic device is in the active mode can be reduced, thereby reducing power consumption.

18 Claims, 3 Drawing Sheets

APPLICATION-AWARE RADIO POWER SAVING

CROSS REFERENCE TO RELATED APPLICATION

This application claims priority under 35 U.S.C. §119(e) to U.S. Provisional Application Ser. No. 61/714,047, entitled "Application-Aware Power Saving," by Kapil Chhabra, Tito Thomas and Amit K. Vyas, Attorney docket number APL-P17548USP1, filed on Oct. 15, 2012, the contents of which is herein incorporated by reference.

BACKGROUND

1. Field

The described embodiments relate to techniques for reducing the power consumption of electronic devices in a wireless network.

2. Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard or Bluetooth™ from the Bluetooth Special Interests Group of Kirkland, Wash.), and/or another type of wireless interface. In order to reduce power consumption when there is no information being wirelessly communicated, these electronic devices often transition the networking subsystem to a standby mode.

However, if the networking subsystem in an electronic device is in standby mode for too long, the clock in the electronic device may lose its synchronization with the clock in another electronic device in a wireless network. As a consequence, the electronic device may routinely re-synchronize its clock with the clock in the other electronic device.

For example, an electronic device that communicates with access point in a wireless network using a communication protocol that is compatible with an IEEE 802.11 standard (which is sometimes referred to as 'Wi-Fi') may wake up its radio periodically to receive a beacon frame with synchronization information (such as a timestamp) at beacon transmission times. After receiving the beacon, the Wi-Fi radio in the electronic device may use the synchronization information to synchronize the radio clock. In addition, the Wi-Fi radio may check the Traffic Indication Map (TIM) element for data for the electronic device that is buffered at the access point, such as unicast data or multicast/broadcast data (for example, data used by an application executing on the electronic device).

If there is a lot of multicast/broadcast data for the electronic device buffered at the access point, the electronic device may stay in the active mode for a long time. Therefore, the existing synchronization technique in wireless networks may significantly increase the power consumption and reduces the operating time of the electronic device, which can frustrate users and degrade the user experience.

SUMMARY

The described embodiments include an electronic device. This electronic device includes: an antenna; an interface circuit, coupled to the antenna, that communicates with another electronic device using a connection in a wireless network; a processor coupled to the interface circuit; and memory that stores applications that can be executed by the processor and a program module that is executed by the processor. The program module facilitates changing of a wake policy of the electronic device. In particular, program module includes: instructions for monitoring a subset of the applications currently executed by the processor, where the subset can include zero or more of the applications; and instructions for changing the wake policy of the interface circuit based on the subset, where the wake policy specifies: how often the interface circuit transitions from a sleep mode to an active mode to receive information from the other electronic device, monitoring of a unicast bit in a Traffic Indication Map (TIM) element and/or monitoring of a multicast bit in the TIM element. Note that power consumption in the sleep mode is lower than in the active mode.

In some embodiments, the wake policy is based on whether the subset includes zero or more applications that use: multicast/broadcast data and unicast data, unicast data, and/or neither of multicast/broadcast data and unicast data. For example, if the subset includes an application that uses multicast/broadcast data and unicast data, the wake policy may specify a first wake-time period. Alternatively, if the subset includes one or more applications that only use unicast data (such as one or more applications that use push notifications), the wake policy may specify a second wake-time period that is larger than the first wake-time period. Moreover, if the subset includes zero applications, the wake policy may specify a third wake-time period that is larger than the second wake-time period. This third wake-time period may facilitate improved responsiveness of the electronic device when a user of the electronic device initiates a transition from the sleep mode to the active mode.

In some embodiments, the other electronic device includes an access point in the wireless network.

Furthermore, the communication via the connection may be compatible with an Institute of Electrical and Electronics Engineers (IEEE) 802.11 standard.

Another embodiment provides a computer-program product for use with the electronic device. This computer-program product includes instructions for at least some of the operations performed by the electronic device.

Another embodiment provides a method for changing the wake policy, which includes at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate reduced power consumption of an electronic device (such as a smartphone) when communicating with another electronic device (such as an access point) in a wireless network, the electronic device may change a wake policy based on the applications executing on the electronic device. In particular, the electronic device may monitor a subset of the applications currently executed by a processor in the electronic device, where the subset can include zero or more of the applications. Based on the subset, the wake policy of an interface circuit in the electronic device may be changed. This wake policy may specify a frequency of wake ups to receive information from the other electronic device and/or monitoring of unicast or multicast bits in a Traffic Indication Map (TIM) element. In this way, the time that the electronic device is in the active mode can be reduced, thereby reducing power consumption.

For example, the information may be conveyed in packets that are transmitted and received by radios in the electronic devices in accordance with a communication protocol, such as an Institute of Electrical and Electronics Engineers (IEEE) 802.11 standard, Bluetooth™ (from the Bluetooth Special Interests Group of Kirkland, Wash.), and/or another type of wireless interface. In the discussion that follows, IEEE 802.11(such as Wi-Fi) is used as an illustrative example. Thus, the wake policy may specify how often the electronic device transitions to the active mode to receive a target beacon from the other electronic device. Furthermore, the wake policy may specify monitoring of a unicast bit in the TIM element and/or monitoring of a multicast bit in the TIM element.

Figure 1:
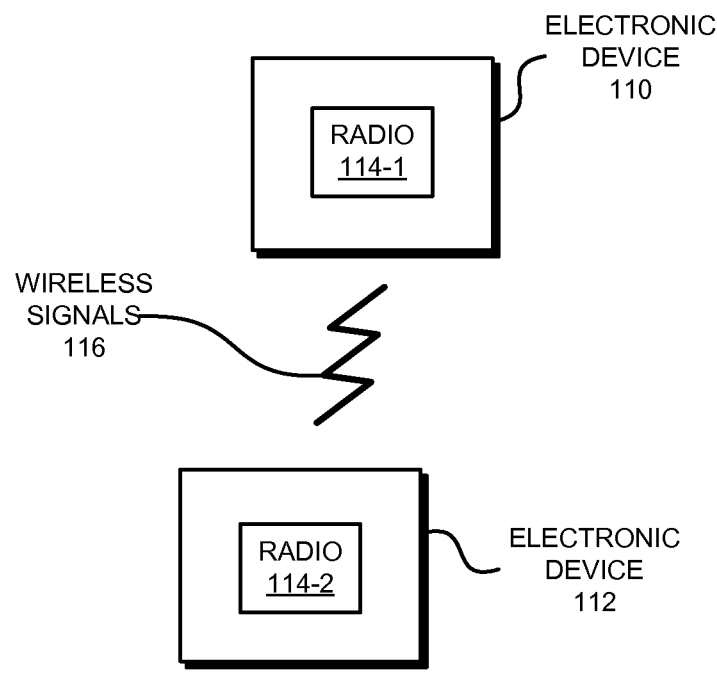
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: discovering one another by scanning wireless channels, transmitting and receiving advertising frames on wireless channels, establishing connections (for example, by transmitting connect requests), and/or transmitting and receiving packets.

Figure 3:
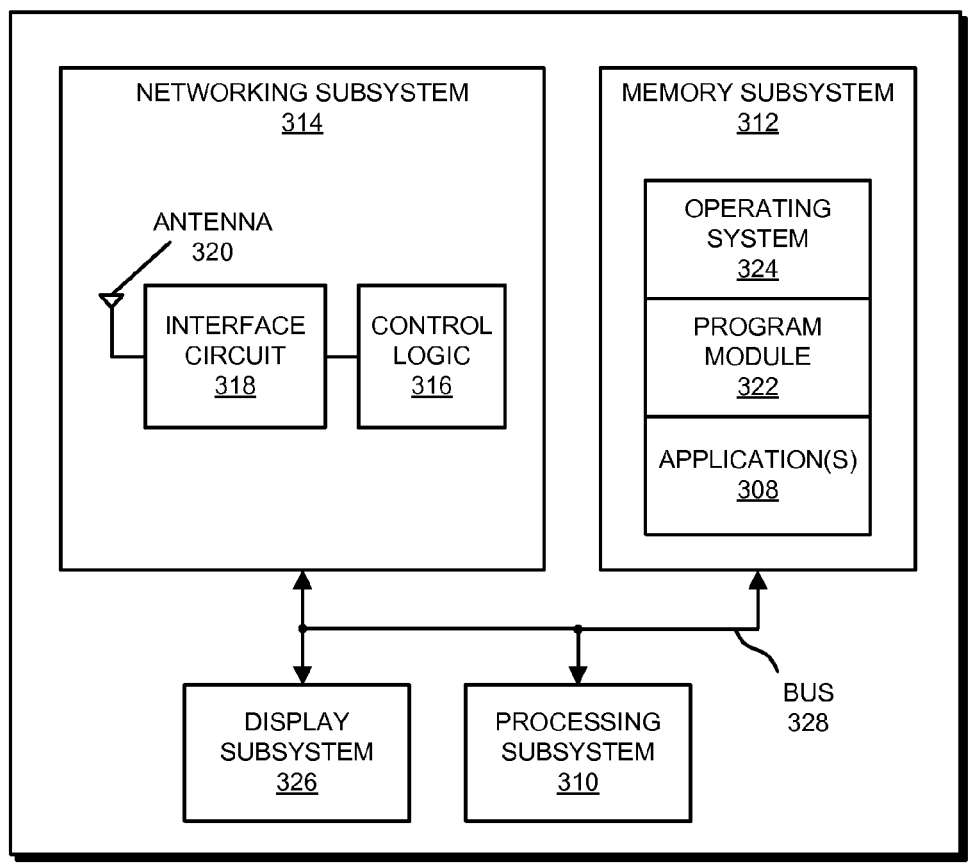
FIG. 3 is a block diagram illustrating one of the electronic devices of FIG. 1 in accordance with an embodiment of the present disclosure.

As described further below with reference to FIG. 3, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with the networking subsystems that enable electronic devices 110 and 112 to wirelessly communicate with another electronic device. This can comprise transmitting advertising frames on wireless channels to enable electronic devices to make initial contact, followed by exchanging subsequent data/management frames (such as connect requests) to establish a connection, configure security options (e.g., IPSEC), transmit and receive packets or frames via the connection, etc.

As can be seen in FIG. 1, wireless signals 116 (represented by jagged lines) are transmitted from a radio 114-1 in electronic device 110. These wireless signals 116 are received by radio 114-2 in electronic device 112.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as synchronization information in the payload).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
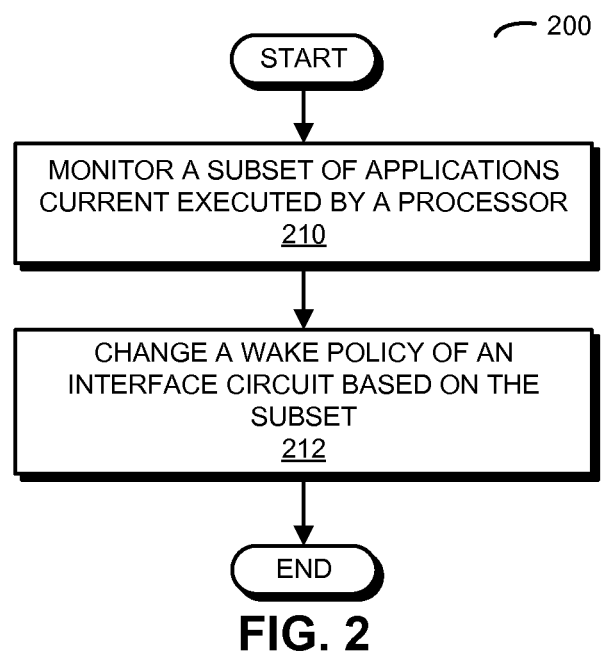
FIG. 2 is a flow diagram illustrating a method for changing a wake policy of one of the electronic devices in FIG. 1 in accordance with an embodiment of the present disclosure.

FIG. 2 presents a flow diagram illustrating a method 200 for changing a wake policy of one of the electronic devices in FIG. 1, such as electronic device 110. During operation, the electronic device monitors a subset of applications currently executed by a processor (operation 210) in the electronic device, where the subset can include zero or more of applications. Then, based on the subset, the electronic device changes the wake policy of an interface circuit in the electronic device (operation 212), where the wake policy specifies: how often the interface circuit transitions from a sleep mode to an active mode to receive information from the other electronic device, monitoring of a unicast bit in the TIM element and/or monitoring of a multicast bit in the TIM element. Note that power consumption in the sleep mode is lower than in the active mode.

In some embodiments, the wake policy is based on whether the subset includes zero or more applications that use: multicast/broadcast data and unicast data, unicast data, and/or neither of multicast/broadcast data and unicast data. For example, if the subset includes an application that uses multicast/broadcast data and unicast data, the wake policy may specify a first wake-time period (such as 900 ms). Alternatively, if the subset includes one or more applications that only use unicast data (such as one or more applications that use push notifications), the wake policy may specify a second wake-time period (such as 2 s) that is larger than the first wake-time period. Moreover, if the subset includes zero applications, the wake policy may specify a third wake-time period (such as 5 s) that is larger than the second wake-time period. This third wake-time period may facilitate improved responsiveness of the electronic device when a user of the electronic device initiates a transition from the sleep mode to the active mode. In particular, because the electronic device does not monitor the broadcast beacon as often (i.e., it remains in the sleep mode), the electronic device may be able to be more responsive and to expedite communication via the wireless network with the other electronic device when the user initiates the transition.

Similarly, the wake policy may specify monitoring of the unicast bit in the TIM element and/or monitoring of the multicast bit in the TIM element. This monitoring may be dynamically adjusted based on the application(s) running on a processor in the electronic device. In particular, if the application(s) running do not use unicast data, then the unicast bit may not be monitored. Moreover, if the application(s) running do not use multicast/broadcast data, then the multicast bit may not be monitored.

In this way, the electronic devices (for example, program modules in the electronic devices) may facilitate reduced power consumption by ensuring that the transitions to the active mode are only as often as they need to be based on the application(s) being executed by the processor in the electronic device. In addition, the electronic devices may check the TIM element for data for the electronic devices that is buffered at the access point, such as unicast data or multicast/broadcast data, as needed based on the applications being executed. This may also reduce the power consumption by ensuring that the electronic devices do not remain in the active mode as long.

In some embodiments of methods 200, there may be additional or fewer operations. Moreover, the order of the operations may be changed, and/or two or more operations may be combined into a single operation.

In an exemplary embodiment, the communication technique allows a portable electronic device (i.e., a wireless client) to communicate with an access point (for example, to synchronize its Wi-Fi radio clock with the clock in the access point) as needed based on the applications running on the portable electronic device. Instead of transitioning to an active mode at the target beacon transmission time of the access point, software (such as a program module) in the portable electronic device may transition the portable electronic device to the active mode based on a wake policy that is dynamically changed when different applications are running, thereby reducing the power consumption of the portable electronic device.

In particular, the power consumption of the portable electronic device while having Wi-Fi associated across access-point sleep (and, thus, periodically transitioning to the active mode to receive beacon frames) can vary from 1-3 mW on a quiet Wi-Fi wireless network to approximately 50 mW in a multicast-heavy Wi-Fi wireless network (which corresponds to a 1%/hr increase in the battery drain). However, the reason for maintaining Wi-Fi connectivity can vary with the use case. Applying the same Wi-Fi power-saving technique to different use cases can be wasteful in terms of power consumption and reduced battery life.

The disclosed communication technique leverages this opportunity to provide multi-level Wi-Fi power saving by monitoring the traffic requirements of different applications running on the portable electronic device and applying the appropriate Wi-Fi power-saving levels to maximize the battery life.

For example, 'Level 0' may provide full Wi-Fi capability so that the portable electronic device can transmit or receive. In this case, the portable electronic device may monitor both unicast and multicast/broadcast buffered data from an access point and may wake frequently to retrieve buffered data (such as when wireless synchronization is enabled).

Alternatively, 'Level 1' may only provide unicast Wi-Fi so that only incoming unicast data is received. As a consequence, no services on the portable electronic device may care about any multicast/broadcast traffic. This can provide a significant power benefit by allowing the portable electronic device to ignore multicast/broadcast traffic (e.g., only receiving push over Wi-Fi). The portable electronic device may further reduce the frequency of radio wakes (relative to Level 0) to save power given that it does not care about multicast/broadcast traffic.

Furthermore, 'Level 2' may only transmit Wi-Fi because the portable electronic device does not care about any unicast or multicast/broadcast packets. In this case, the goal may be to maintain Wi-Fi connectivity so that outgoing traffic can be sent promptly over Wi-Fi after a user wakes the device. This may provide the ability for the portable electronic device to be even more aggressive with power saving. For example, the portable electronic device may ignore both unicast and multicast/broadcast traffic indication bits in beacons and may wake infrequently (i.e., the frequency of wake-ups may be lower than in Level 0 and Level 1).

In this way, portable electronic device can dynamically change how often it transitions from the wake mode to the active mode, thereby significantly reducing power consumption.

We now describe embodiments of the electronic device. FIG. 3 presents a block diagram illustrating an electronic device 300, such as one of electronic devices 110 and 112 in FIG. 1. This electronic device includes processing subsystem 310, memory subsystem 312, and networking subsystem 314. Processing subsystem 310 includes one or more devices configured to perform computational operations. For example, processing subsystem 310 can include one or more microprocessors, application-specific integrated circuits (ASICs), microcontrollers, programmable-logic devices, and/or one or more digital signal processors (DSPs).

Memory subsystem 312 includes one or more devices for storing data and/or instructions for processing subsystem 310 and networking subsystem 314. For example, memory subsystem 312 can include dynamic random access memory (DRAM), static random access memory (SRAM), and/or other types of memory. In some embodiments, instructions for processing subsystem 310 in memory subsystem 312 include: one or more program modules or sets of instructions (such as one or more applications 308 and program module 322), which may be executed by processing subsystem 310. Note that the one or more computer programs may constitute a computer-program mechanism. Moreover, instructions in the various modules in memory subsystem 312 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 310.

In addition, memory subsystem 312 can include mechanisms for controlling access to the memory. In some embodiments, memory subsystem 312 includes a memory hierarchy that comprises one or more caches coupled to a memory in electronic device 300. In some of these embodiments, one or more of the caches is located in processing subsystem 310.

In some embodiments, memory subsystem 312 is coupled to one or more high-capacity mass-storage devices (not shown). For example, memory subsystem 312 can be coupled to a magnetic or optical drive, a solid-state drive, or another type of mass-storage device. In these embodiments, memory subsystem 312 can be used by electronic device 300 as fast-access storage for often-used data, while the mass-storage device is used to store less frequently used data.

Networking subsystem 314 includes one or more devices configured to couple to and communicate on a wired and/or wireless network (i.e., to perform network operations), including: control logic 316, an interface circuit 318 and an antenna 320. For example, networking subsystem 314 can include a Bluetooth™ networking system, a cellular networking system (e.g., a 5G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 314 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 300 may use the mechanisms in networking subsystem 314 for performing simple wireless communication between the electronic devices, e.g., transmitting advertising frames and/or scanning for advertising frames transmitted by other electronic devices as described previously.

Moreover, program module 322 may monitor which (if any) of applications 308 are currently being executed by processing subsystem 310. Based on the application(s) currently being executed, program module 322 may change a wake policy of networking subsystem 314 (and, in particular, of interface circuit 318).

Within electronic device 300, processing subsystem 310, memory subsystem 312, and networking subsystem 314 are coupled together using bus 328. Bus 328 may include an electrical, optical, and/or electro-optical connection that the subsystems can use to communicate commands and data among one another. Although only one bus 328 is shown for clarity, different embodiments can include a different number or configuration of electrical, optical, and/or electro-optical connections between the subsystems.

In some embodiments, the electronic device includes a display subsystem 326 for displaying information on a display, which may include a display driver and the display, such as a liquid-crystal display, a multi-touch touchscreen, etc.

Electronic device 300 can be (or can be included in) any electronic device with at least one network interface. For example, electronic device 300 can be (or can be included in): a desktop computer, a laptop computer, a server, a media player (such as an MP5 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 300, in alternative embodiments, different components and/or subsystems may be present in electronic device 300. For example, electronic device 300 may include one or more additional processing subsystems 310, memory subsystems 312, networking subsystems 314, and/or display subsystems 326. Additionally, one or more of the subsystems may not be present in electronic device 300. Moreover, in some embodiments, electronic device 300 may include one or more additional subsystems that are not shown in FIG. 3. For example, electronic device 300 can include, but is not limited to, a data collection subsystem, an audio and/or video subsystem, an alarm subsystem, a media processing subsystem, and/or an input/output (I/O) subsystem. Also, although separate subsystems are shown in FIG. 3, in some embodiments, some or all of a given subsystem or component can be integrated into one or more of the other subsystems or component(s) in electronic device 300. For example, in some embodiments program module 322 is included in operating system 324.

Moreover, the circuits and components in electronic device 300 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 314, such as a radio. Moreover, the integrated circuit may include hardware and/or software mechanisms that are used for transmitting wireless signals from electronic device 300 (FIG. 3) and receiving signals at electronic device 300 from other electronic devices (FIG. 3). Aside from the mechanisms herein described, radios are generally known in the art and hence are not described in detail. In general, networking subsystem 314 (FIG. 3) and/or the integrated circuit can include any number of radios. Note that the radios in multiple-radio embodiments function in a similar way to the described single-radio embodiments.

In some embodiments, networking subsystem 314 (FIG. 3) and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with the IEEE 802.11 standard was used as an illustrative example, the described embodiments of the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, program module 322 can be implemented in a link layer or in firmware in a wireless client (such as electronic device 110 in FIG. 1). Alternatively or additionally, at least a portion of the communication technique may be implemented in a physical layer in the wireless client.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
an antenna;
an interface circuit, coupled to the antenna, configured to communicate with another electronic device using a connection in the wireless network;
a processor; and
memory, wherein the memory stores applications and a program module, wherein the applications are configured to be executed by the processor, and wherein the program module is configured to be executed by the processor to select a wake policy of the electronic device, the program module including:

instructions for monitoring a subset of the applications currently executed by the processor, wherein the subset can include zero or more of the applications; and instructions for selecting the wake policy of the interface circuit based on the subset, wherein, when the subset includes an application that uses multicast/broadcast data and unicast data, the wake policy specifies a first wake period wherein, when the subset includes one or more applications that only use unicast data, the wake policy specifies a second wake-time period that is different than the first wake-time period.

2. The electronic device of claim 1, wherein, when the subset includes one or more applications that only use unicast data, the wake policy further specifies a second wake-time period that is larger than the first wake-time period.

3. The electronic device of claim 2, wherein the one or more applications use push notifications.

4. The electronic device of claim 2, wherein, if the subset includes zero applications, the wake policy specifies a third wake-time period that is larger than the second wake-time period.

5. The electronic device of claim 4, wherein the third wake-time period facilitates improved responsiveness of the electronic device when a user of the electronic device initiates a transition from the sleep mode to the active mode.

6. The electronic device of claim 1, wherein the wake policy is based on whether the subset includes zero or more applications that use at item selected from the group consisting of: multicast/broadcast data and unicast data, unicast data, and neither of multicast/broadcast data and unicast data.

7. The electronic device of claim 1, wherein the other electronic device includes an access point in the wireless network.

8. The electronic device of claim 1, wherein the wake policy specifies an item in the group consisting of: how often the interface circuit transitions from a sleep mode to an active mode to receive information from the other electronic device, monitoring of a unicast bit in a Traffic Indication Map (TIM) element, and monitoring of a multicast bit in the TIM element; and wherein power consumption in the sleep mode is lower than in the active mode.

9. A computer-program product for use in conjunction with an electronic device, the computer-program product comprising a non-transitory computer-readable storage medium and a computer-program mechanism embedded therein, to select a wake policy of an electronic device, the computer-program mechanism including:

instructions for monitoring a subset of applications currently executed by a processor in the electronic device, wherein the subset can include zero or more of applications; and instructions for selecting the wake policy of an interface circuit in the electronic device based on the subset, wherein, when the subset includes an application that uses multicast/broadcast data and unicast data, the wake policy specifies a first wake period wherein, when the subset includes one or more applications that only use unicast data, the wake policy specifies a second wake-time period that is different than the first wake-time period.

10. The computer-program product of claim 9, wherein, when the subset includes one or more applications that only use unicast data, the wake policy further specifies a second wake-time period that is larger than the first wake-time period.

11. The computer-program product of claim 10, wherein the one or more applications use push notifications.

12. The computer-program product of claim 10, wherein, if the subset includes zero applications, the wake policy specifies a third wake-time period that is larger than the second wake-time period.

13. The computer-program product of claim 12, wherein the third wake-time period facilitates improved responsiveness of the electronic device when a user of the electronic device initiates a transition from the sleep mode to the active mode.

14. The computer-program product of claim 9, wherein the wake policy is based on whether the subset includes zero or more applications that use at item selected from the group consisting of: multicast/broadcast data and unicast data, unicast data, and neither of multicast/broadcast data and unicast data.

15. The computer-program product of claim 9, wherein the other electronic device includes an access point in the wireless network.

16. The computer-program product of claim 9, wherein the wake policy specifies an item in the group consisting of: how often the interface circuit transitions from a sleep mode to an active mode to receive information from the other electronic device, monitoring of a unicast bit in a Traffic Indication Map (TIM) element, and monitoring of a multicast bit in the TIM element; and wherein power consumption in the sleep mode is lower than in the active mode.

17. A method for selecting a wake policy of an electronic device, wherein the method comprises:

monitoring a subset of applications currently executed by a processor in the electronic device, wherein the subset can include zero or more of applications; and selecting the wake policy of an interface circuit in the electronic device based on the subset, wherein, when the subset includes an application that uses multicast/broadcast data and unicast data, the wake policy specifies a first wake period wherein, when the subset includes one or more applications that only use unicast data, the wake policy specifies a second wake-time period that is different than the first wake-time period.

18. The method of claim 17, wherein the wake policy is based on whether the subset includes zero or more applications that use at item selected from the group consisting of: multicast/broadcast data and unicast data, unicast data, and neither of multicast/broadcast data and unicast data.

* * * * *